(12) United States Patent
Mizuno (10) Patent No.: US 8,540,179 B2
(45) Date of Patent: Sep. 24, 2013

(54) WEBBING TAKE-UP DEVICE

(75) Inventor: Yoshio Mizuno, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 258 days.

(21) Appl. No.: 13/155,108

(22) Filed: Jun. 7, 2011

(65) Prior Publication Data

US 2011/0303779 A1 Dec. 15, 2011

(30) Foreign Application Priority Data

Jun. 10, 2010 (JP) ................................ 2010-132949

(51) Int. Cl.
*B65H 75/48* (2006.01)

(52) U.S. Cl.
USPC ...................................................... 242/379.1

(58) Field of Classification Search
USPC .......................... 242/375, 375.1–375.3, 379.1
See application file for complete search history.

(56) References Cited

U.S. PATENT DOCUMENTS

| | | | |
|---|---|---|---|
| 5,636,806 A | 6/1997 | Sayles | |
| 5,967,442 A * | 10/1999 | Wier | 242/379.1 |
| 6,669,133 B2 * | 12/2003 | Palliser et al. | 242/379.1 |
| 6,676,058 B2 * | 1/2004 | Nagata et al. | 242/379.1 |
| 6,969,022 B2 * | 11/2005 | Bell et al. | 242/379.1 |
| 7,025,297 B2 * | 4/2006 | Bell et al. | 242/384 |

FOREIGN PATENT DOCUMENTS

| | | |
|---|---|---|
| JP | 2010000828 | 1/2010 |
| JP | 2010052647 | 3/2010 |
| JP | 2010058773 | 3/2010 |
| JP | 2010089652 | 4/2010 |
| JP | 2010095058 | 4/2010 |

* cited by examiner

*Primary Examiner* — Sang Kim
(74) *Attorney, Agent, or Firm* — Roberts Mlotkowski Safran & Cole, P.C.

(57) ABSTRACT

When a retaining portion for a first load absorbing wire and a second insertion hole of a second load absorbing wire are aligned with each other in a spool radial direction, and a retaining portion for the second load absorbing wire and a first insertion hole of the first load absorbing wire are aligned with each other in a spool radial direction, the forming position of the retaining portion for the first load absorbing wire is set further to the spool radial direction outside than the second insertion hole so that the retaining portion of the first load absorbing wire and the second insertion hole do not align with each other along the spool axial direction in this state. Similarly the forming position of the retaining portion for the second load absorbing wire is set further to the spool radial direction outside than the first insertion hole.

5 Claims, 9 Drawing Sheets

WEBBING TAKE-UP DEVICE

CROSS-REFERENCE TO RELATED APPLICATION

This application claims priority under 35 USC 119 from Japanese Patent Application No. 2010-132949 filed on Jun. 10, 2010, the disclosure of which is incorporated by reference herein.

BACKGROUND OF THE INVENTION

1. Field of the Invention

The present invention relates to a webbing take-up device for taking up and storing webbing that restrains the body of a vehicle occupant.

2. Description of the Related Art

In a webbing take-up device described in Japanese Patent Application Laid-Open (JP-A) No. 2010-828, when a lock mechanism is actuated and a spool is rotated in a pullout direction in a state in which rotation of the lock base in the pullout direction is restricted, two strands of load absorbing wire deform in the spool circumferential direction while they are being pulled out towards an axial direction end side of the spool. The force rotating the spool in the pullout direction, namely, a part of the force pulling one end of the webbing, is used for deforming the two strands of load absorbing wire and absorbed.

In the configuration described in JP-A No. 2010-828, when the sum of the lengths of portions of each of the load absorbing wires inserted into each insertion hole is longer than the circumferential direction length of an annular shaped groove in the spool, sometimes the load absorbing wires impede each other when, due to rotation of the spool in the pullout direction relative to the lock base, the portion of one of the load absorbing wires retained in the lock base approaches the insertion hole inserted with the other load absorbing wire. Accordingly, the configuration described in JP-A No. 2010-828 has stringent limitations to the lengths of the load absorbing wires.

SUMMARY OF THE INVENTION

In consideration of the above circumstances, the present invention provides a webbing take-up device with few limitations to the lengths of the first energy absorbing member and the second energy absorbing member, enabling a longer energy absorbing stroke to be obtained.

A first aspect of the present invention is a webbing take-up device including: a spool that takes up and stores a long band-shaped webbing from a length direction base end side of the webbing by rotating in a take-up direction, and that is rotated in a pullout direction opposite to the take-up direction by the webbing being pulled towards a leading end side; a first energy absorbing member inserted into a first insertion hole formed in the spool at a position separated in a radial direction from a central axis of the spool and opening at a first axial direction end of the spool; a second energy absorbing member inserted into a second insertion hole formed at a different position in the spool from the forming position of the first insertion hole, at a position separated in a radial direction from the central axis of the spool and opening at the first axial direction end of the spool; a coupling member coupled to a portion at a second axial direction end of the spool or at an intermediate axial direction portion of the spool such that the coupling member is not able to perform relative rotation with respect to the spool; a lock unit including a lock base and restricting rotation of the lock base when actuated. The lock base is provided at the first axial direction end side of the spool so as to be rotatable relative to the spool, is coupled through the coupling member to the spool so as to be non-rotatable relative to the spool, and retains base end portions of the first energy absorbing member and the second energy absorbing member. By relative rotation with respect to the spool in the take-up direction, the lock base engages the first energy absorbing member with the spool and deforms the first energy absorbing member along a spool circumferential direction while pulling the first energy absorbing member out from the first insertion hole. By relative rotation with respect to the spool in the take-up direction, the lock base engages the second energy absorbing member with the spool and deforms the second energy absorbing member along the spool circumferential direction while pulling the second energy absorbing member out from the second insertion hole. The base end portion of the second energy absorbing member is retained at the first axial direction end of the spool by the lock base at a position separated further away to the rotation radial direction outside from the central axis of the spool than a distance from the central axis of the spool to the first insertion hole opening position at the first axial direction end of the spool. The base end portion of the first energy absorbing member is retained at the first axial direction end of the spool by the lock base at a position separated further away to the rotation radial direction outside from the central axis of the spool than a distance from the central axis of the spool to the second insertion hole opening position at the first axial direction end of the spool.

According to the webbing take-up device of the first aspect of the present invention, the lock unit restricts rotation of the lock base in the pullout direction when in a vehicle rapid deceleration state and/or when the spool is abruptly rotated in the pullout direction. Due to the lock base being coupled to the spool through the coupling member, rotation of the spool in the pullout direction is restricted by restricting rotation of the lock base in the pullout direction. The webbing is thereby restricted from being pulled out from the spool, firmly using the webbing to restrain the body of the occupant wearing the webbing.

The spool is coupled to the lock base by the coupling member so as to become a single unit. However, for example when due to inertia the webbing is pulled out abruptly by the body of an occupant under rapid vehicle deceleration and this results in a rotation force in the pullout direction being applied to the spool of a specific magnitude or greater, the spool is rotated in the pullout direction while the restriction of rotation of the lock base is maintained, allowing webbing to be pulled out from the spool of an amount equivalent to this rotation.

However, when such relative rotation occurs between the lock base and the spool, the base end portions of the first energy absorbing member and the second energy absorbing member retained in the lock base also rotate relative to the spool. The leading end side of the first energy absorbing member is inserted into a first insertion hole formed in the spool, and the leading end side of the second energy absorbing member is inserted into a second insertion hole formed in the spool.

Each of the base end portions of the first energy absorbing member and the second energy absorbing member, together with the lock base, therefore rotate relative to the spool, resulting in the leading end side of the first energy absorbing member being pulled out of the first insertion hole, and the leading end side of the second energy absorbing member being pulled out of the second insertion hole. Distortion is generated in the first energy absorbing member and the second energy absorbing member when the leading end sides of the first energy absorbing member and the second energy absorbing member are being pulled out from the first insertion hole and the second insertion hole, respectively, resulting in a portion of the energy pulling the webbing being channeled into distorting the first energy absorbing member and the second energy absorbing member, and thereby absorbed.

In the webbing take-up device of the present invention, the separation distance from the central axis of the spool to the position at the lock base where the first energy absorbing member is retained is further away from the central axis of the spool than the distance to the second insertion hole opening position at the first axial direction end of the spool. The separation distance from the central axis of the spool to the position at the lock base where the second energy absorbing member is retained is further away from the central axis of the spool than the distance to the first insertion hole opening position at the first axial direction end of the spool.

Accordingly, the base end portion of the first energy absorbing member can pass further to the spool radial direction outside than the portion of the second energy absorbing member that has just been pulled out from the second insertion hole, and the base end portion of the second energy absorbing member can pass further to the spool radial direction outside than the portion of the first energy absorbing member that has just been pulled out from the first insertion hole. The sum of the length of the first energy absorbing member and the length of the second energy absorbing member pulled out from the spool can accordingly be set longer than the circumferential direction length along an imaginary circle passing through the centers of the opening positions of the first insertion hole and the second insertion hole and centered on the central axis of the spool.

A webbing take-up device according to a second aspect of the present invention is the webbing take-up device of the first aspect, wherein the base end portion of the first energy absorbing member is retained by the lock base so as to be capable of swinging about an axis parallel to the central axis of the spool, and a length of a portion of the first energy absorbing member inserted into the first insertion hole is set the same as or less than a length along the pullout direction from the first insertion hole opening position to the second insertion hole opening position at the first axial direction end of the spool.

According to the webbing take-up device of the second exemplary embodiment, the length of the portion of the first energy absorbing member inserted into the first insertion hole is set the same as or less than the length along the pullout direction from the first insertion hole opening position to the second insertion hole opening position at the first axial direction end of the spool, and the base end portion of the first energy absorbing member is retained by the lock base so as to be capable of swinging about an axis parallel to the central axis of the spool.

When the spool rotates in the pullout direction relative to the lock base and the second insertion hole opening position at the first axial direction end of the spool has passed at the side of the first energy absorbing member retained position in the lock base, the portion of the second energy absorbing member that has just been pulled out from the second insertion hole impinges on the first energy absorbing member. Accordingly, due to pressing force from the second energy absorbing member, the first energy absorbing member is swung, about the portion of the first energy absorbing member retained in the lock base, towards the direction of separation from the second energy absorbing member. Accordingly, the second energy absorbing member can continue to be pulled out from the second insertion hole and deformed, even after impinging on the first energy absorbing member.

A webbing take-up device according to a third aspect of the present invention is the webbing take-up device of the first aspect, further including: a first guide portion provided at the take-up direction side of the second insertion hole opening position at the first axial direction end of the spool so as to be capable of interacting with the first energy absorbing member, the first guide portion guiding the first energy absorbing member further to the spool radial direction outside than the second insertion hole by interacting with the first energy absorbing member; and a second guide portion provided at the take-up direction side of the first insertion hole opening position at the first axial direction end of the spool so as to be capable of interacting with the second energy absorbing member, the second guide portion guiding the second energy absorbing member further to the spool radial direction outside than the first insertion hole by interacting with the second energy absorbing member.

In the webbing take-up device according to the third aspect, when the spool rotates in the pullout direction relative to the lock base and the second insertion hole opening at the first axial direction end of the spool has reached the vicinity at the side of the first energy absorbing member retained position in the lock base, the first energy absorbing member interacts with the first guide portion of the spool. The first energy absorbing member is guided to the spool radial direction outside by the first guide portion when there is further rotation from this state of the spool in the pullout direction relative to the lock base. Accordingly, when the base end portion of the first energy absorbing member passes to the side of the second insertion hole, the first energy absorbing member is deformed as it passes to the outside of the second energy absorbing member being pulled out from the second insertion hole.

When the spool rotates in the pullout direction relative to the lock base and the first insertion hole opening at the first axial direction end of the spool reaches the vicinity at the side of the second energy absorbing member retained position in the lock base, the second energy absorbing member interacts with the second guide portion. The second energy absorbing member is guided to the spool radial direction outside by the second guide portion when there is further rotation from this state of the spool in the pullout direction relative to the lock base. Accordingly, when the base end portion of the second energy absorbing member passes to the side of the first insertion hole, the second energy absorbing member is deformed as it passes to the outside of the first energy absorbing member being pulled out from the first insertion hole.

As explained above, in the webbing take-up device according to the present invention there is no limitation to the lengths of the first energy absorbing member and the second energy absorbing member, and a long energy absorbing stroke can be obtained.

BRIEF DESCRIPTION OF THE DRAWINGS

Exemplary embodiments of the present invention will be described in detail based on the following figures, wherein.

DETAILED DESCRIPTION OF THE INVENTION

First Exemplary Embodiment

Figure 1:
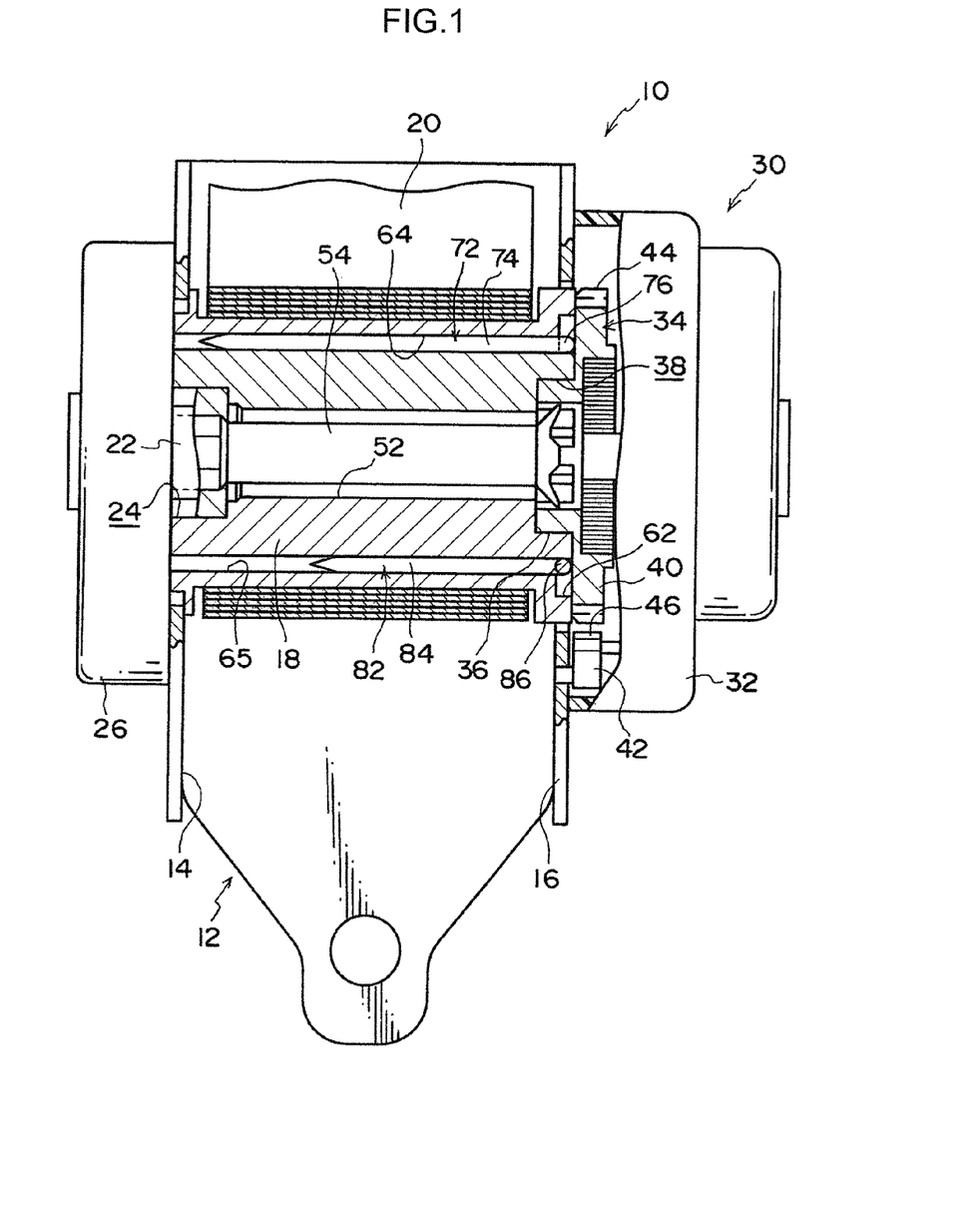
FIG. 1 is a cross-section illustrating a schematic configuration of a webbing take-up device according to a first exemplary embodiment of the present invention as viewed from the front.
Figure 2:
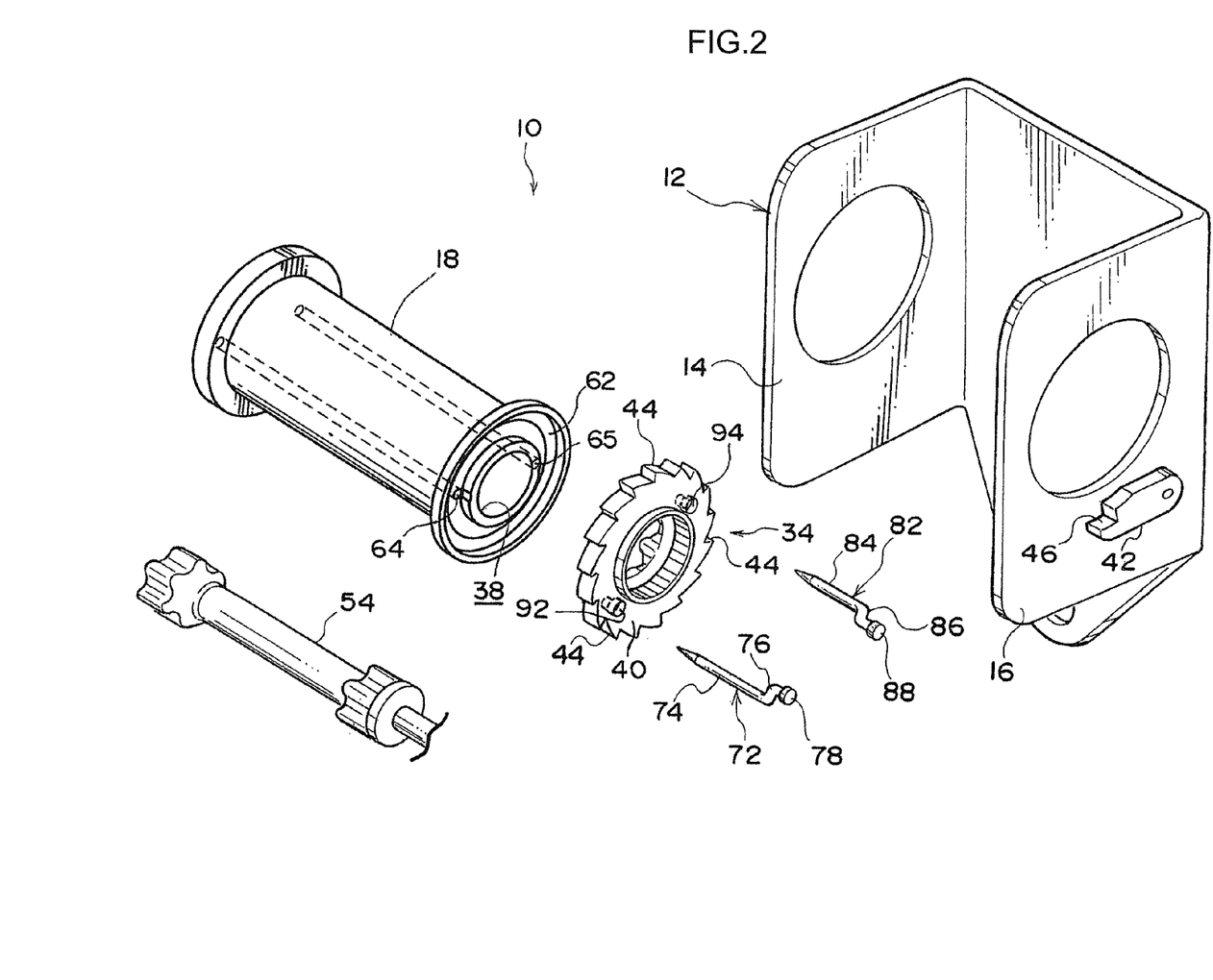
FIG. 2 is an exploded perspective view of a schematic configuration of relevant portions of a webbing take-up device according to the first exemplary embodiment of the present invention.

FIG. 1 is a front cross-section illustrating a schematic configuration of a webbing take-up device 10 according to a first exemplary embodiment of the present invention, and FIG. 2 is an exploded perspective view of relevant portion configuring the webbing take-up device 10.

As shown in FIG. 1 and FIG. 2, the webbing take-up device 10 includes a frame 12 fastened and fixed to a specific location on a vehicle body. The frame 12 is provided with a pair of leg plates 14, 16. Each of the leg plates 14, 16 is formed in a flat plate shape, with the leg plates 14, 16 facing each other along their thickness directions. A spool 18 is disposed between the leg plate 14 and the leg plate 16. The spool 18 is formed with a substantially circular cylinder shape with an axial direction aligned with the facing direction of the leg plate 14 and the leg plate 16. The spool 18 is rotatable about its own center axis.

A length direction base end of a long band-shaped webbing 20 is anchored to the spool 18. The webbing 20 is wound up in layers on an outer peripheral portion of the spool 18 from the length direction base end of the webbing 20 when the spool 18 rotates in a take-up direction that is one direction about its own central axis. When the webbing 20 is pulled towards the leading end side, the webbing 20 that has been taken up on the spool 18 is pulled out, and the spool 18 rotates in a pullout direction, the opposite direction to the take-up direction.

An adapter 22 is provided on the leg plate 14 side of the spool 18. The adapter 22 is fitted into a fit-insertion hole 24 opened in an end portion of the spool 18 on the leg plate 14 side. The inner peripheral shape of the fit-insertion hole 24 and the outer peripheral shape of the adapter 22 are non-circular shapes, such that when fitted into the fit-insertion hole 24 the adapter 22 is not able to undertake rotation relative to the spool 18 about the central axis of the spool 18. Accordingly, when one or other of the spool 18 or the adapter 22 rotates about the central axis of the spool 18, the other also rotates together as a single body.

The adapter 22 passes through the leg plate 14, and is inserted into a spring housing 26 fixed to the frame 12 at the side of the leg plate 14 (the opposite side of the leg plate 14 to the leg plate 16 side). The adapter 22 is accordingly supported by the spring housing 26 so as to be rotatable about the central axis of the spool 18. Biasing means, such as a spiral coiled spring, is housed inside the spring housing 26. A portion of the biasing means is directly or indirectly coupled to the adapter 22, and accordingly when rotated in the pullout direction the adapter 22 is biased in the take-up direction.

A housing 32 for a lock mechanism 30, serving as a lock unit, is fixed to the frame 12 at the other side of the leg plate 16 (the opposite side of the leg plate 16 to the leg plate 14 side). The lock mechanism 30 is equipped with a lock base 34. The lock base 34 is equipped with a circular cylinder shaped fitting portion 36 of relatively short length in the axial direction. A fitting hole 38 is formed in the spool 18 so as to align with the fitting portion 36. The inner peripheral shape of the fitting hole 38 opening to the end face on the leg plate 16 side of the spool 18 is a circular shape coaxial to the spool 18. The internal radial dimension of the fitting hole 38 is slightly greater than the external radial dimension of the fitting portion 36, such that the lock base 34 is able to rotate relative to the spool 18 about the central axis of the spool 18 when the fitting portion 36 is in an inserted state into the fitting hole 38.

The lock base 34 includes a ratchet portion 40. The ratchet portion 40 is configured by an externally toothed ratchet wheel, formed coaxial to the fitting portion 36 so as to be adjacent to the end face of the spool 18 on the leg plate 16 side when the fitting portion 36 is in an inserted state into the fitting hole 38. A lock pawl 42 configuring the lock mechanism 30 is provided at a lock base 34 rotation radial direction side of the ratchet portion 40. The lock pawl 42 is supported by the leg plate 16 so as to be able to swing about an axis in the same axial direction as the axial direction of the spool 18.

Figure 5:
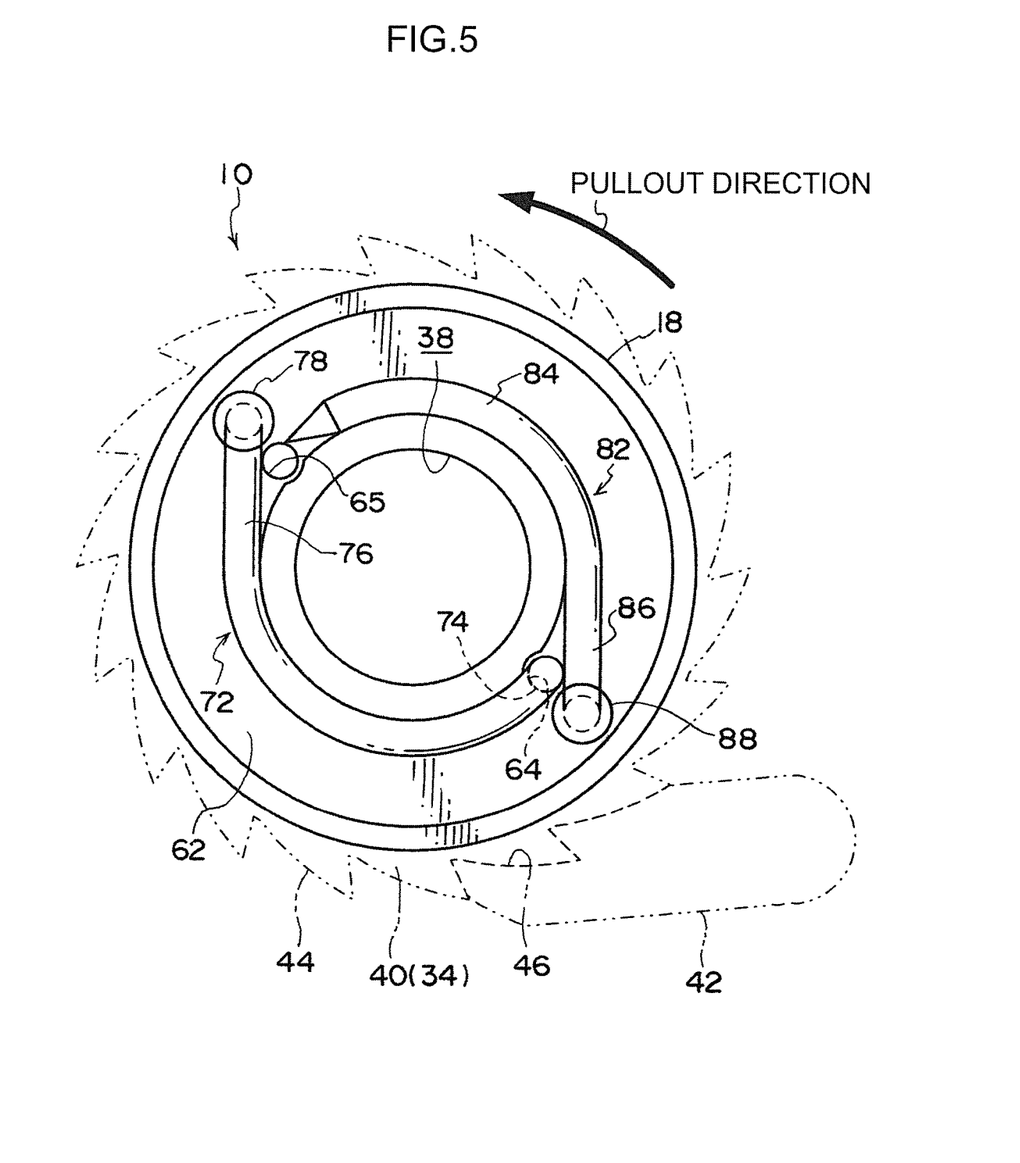
FIG. 5 is a side view corresponding FIG. 3, illustrating a state in which the first insertion hole opening end and the retained portion of the second energy absorbing member in the lock base are aligned with each other along a spool radial direction, and the second insertion hole opening end and the retained portion of the first energy absorbing member in the lock base are aligned with each other along a spool radial direction.

The lock pawl 42 approaches or separates from the outer peripheral portion of the ratchet portion 40 by swinging. Lock teeth 46 are formed on the lock pawl 42 so as to be capable of meshing with ratchet teeth 44 formed on the outer peripheral portion of the ratchet portion 40. The lock teeth 46 of the lock pawl 42 mesh with the ratchet teeth 44 of the ratchet portion 40 when the lock pawl 42 swings towards the outer peripheral portion of the ratchet portion 40, as shown in FIG. 5. In the meshed state of the lock teeth 46 with the ratchet teeth 44, the ratchet portion 40, namely rotation of the lock base 34 in the pullout direction, is restricted.

Various other members configuring the lock mechanism 30 other than the lock pawl 42 are also housed inside the housing 32. The lock mechanism 30 is actuated when the vehicle installed with the webbing take-up device 10 is in a rapid deceleration state and when the lock base 34 is rotated abruptly in the pullout direction, with the lock teeth 46 swinging in the direction to approach and mesh with the ratchet teeth 44.

As shown in FIG. 1, a through hole 52 is formed in the spool 18. The through hole 52 is formed coaxial to the spool 18, with one end of the through hole 52 opening at a bottom portion of the fit-insertion hole 24, and the other end of the through hole 52 opening at a bottom portion of the fitting hole 38. At the inside of the through hole 52 are provided a torsion shaft 54 for configuring a coupling member serving as a energy absorbing means, which is separately provided from a first load absorbing wire 72, serving as a first energy absorbing member and a second load absorbing wire 82, serving as a second energy absorbing member, these described later. An end portion on the leg plate 14 side of the torsion shaft 54 is coupled to the adapter 22 in a state in which rotation relative to the adapter 22 is not possible about the central axis of the spool 18.

An end portion on the leg plate 16 side of the torsion shaft 54 is coupled to the fitting portion 36 (the lock base 34) in a state in which rotation relative to the fitting portion 36 (the lock base 34) is not possible about the central axis of the spool 18. Namely, as described above, the lock base 34 has the fitting portion 36 fitted into the fitting hole 38 so as to be capable of relative rotation with respect to the spool 18 about the central axis of the spool 18, however the torsion shaft 54 is not able to rotate relative to either the spool 18 or the lock base 34 about the central axis of the spool 18. Accordingly, the lock base 34 is basically not able to rotate relative to the spool 18, and the spool 18 and the lock base 34 rotate together as a single body. Consequently, if the lock teeth 46 of the lock pawl 42 mesh with the ratchet teeth 44 of the lock base 34 then rotation of the spool 18 is restrained in the pullout direction.

Figure 3:
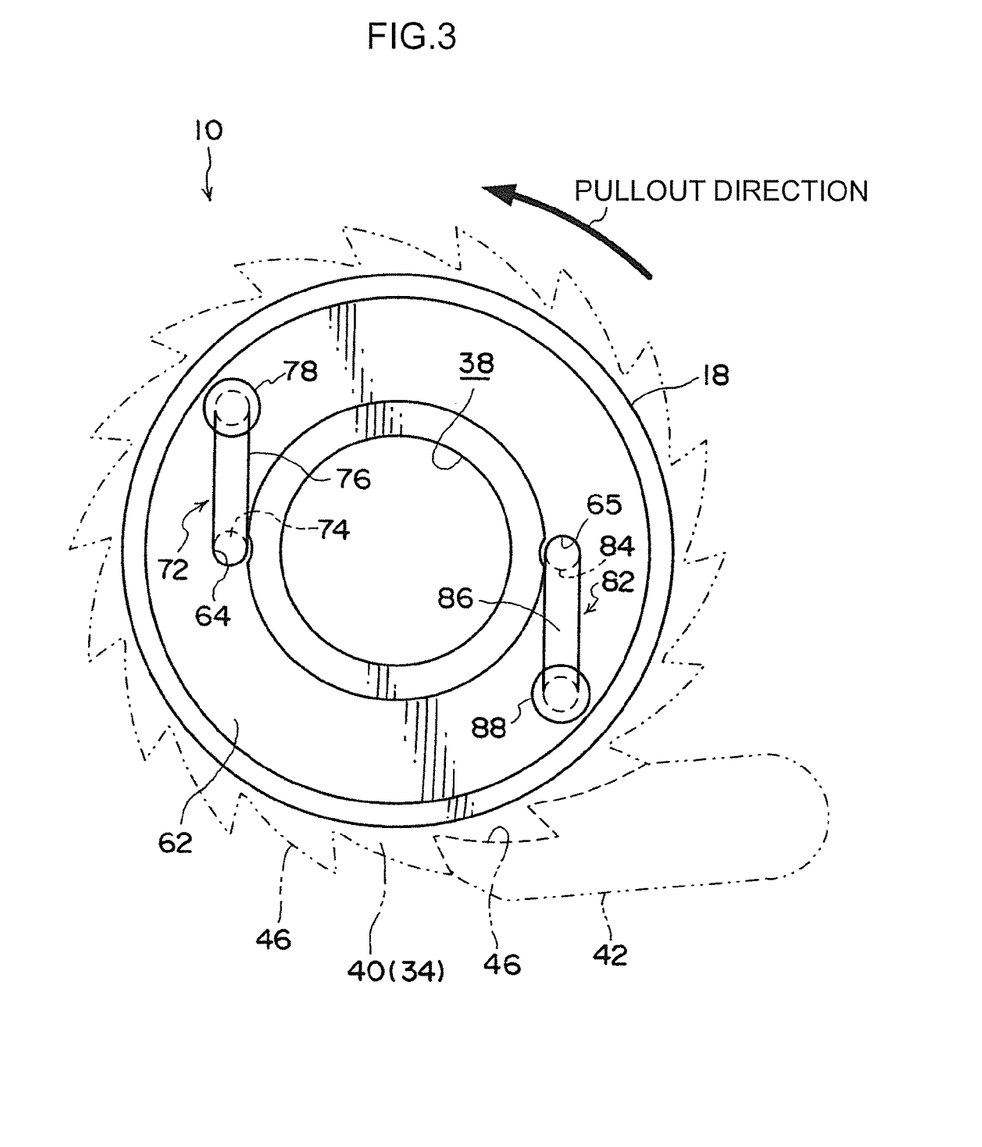
FIG. 3 is a side view illustrating a schematic configuration of relevant portions of a webbing take-up device according to the first exemplary embodiment of the present invention.

As shown in FIG. 1 and FIG. 2, a housing hole 62 is formed in an end portion on the leg plate 16 side of the spool 18. As shown in FIG. 2 and FIG. 3, the housing hole 62 is formed in a circular shape coaxial to the central axis of the spool 18, and opening at an end face of the spool 18 on the leg plate 16 side. As shown in FIG. 1 and FIG. 2, plural insertion holes (two in the present exemplary embodiment) are formed in the spool 18, there being a first insertion hole 64 and a second insertion hole 65.

As shown in FIG. 1, one end of the first insertion hole 64 opens onto the end face of the spool 18 at the leg plate 14 side, and the other end of the first insertion hole 64 opens onto a bottom portion of the housing hole 62. The direction along from one end of the first insertion hole 64 towards the other is the same direction as the central axis direction of the spool 18. The second insertion hole 65 is formed in a position shifted about the central axis of the spool 18 by about 180 degrees from the first insertion hole 64. One end of the second insertion hole 65 opens onto the end face of the spool 18 on the leg plate 14 side, and the other end opens onto the bottom portion of the housing hole 62. The direction along from one end of the second insertion hole 65 towards the other is the same direction as the central axis direction of the spool 18.

As shown in FIG. 2, the webbing take-up device 10 is provided with the first load absorbing wire 72, serving as the first energy absorbing member, and the second load absorbing wire 82, serving as the second energy absorbing member. The first load absorbing wire 72 includes an insertion portion 74. The leading end of the insertion portion 74 is formed in a bar shape with circular shaped cross-section, having a taper that tapering towards the leading end.

The external radial dimension of other non-tapered portions of the insertion portion 74 is the internal radial dimension of the first insertion hole 64 or less. A bar shaped portion 76 is formed continuous to the base end portion of the insertion portion 74. The bar shaped portion 76 has an external radial dimension that is substantially the same as the external radial dimension of the insertion portion 74, with the length direction of the bar shaped portion 76 being orthogonal to the length direction of the insertion portion 74. A head portion 78 is formed continuous to a portion of the bar shaped portion 76 at the opposite end to the insertion portion 74.

As shown in FIG. 3, the second load absorbing wire 82 has fundamentally the same structure as the first load absorbing wire 72. The second load absorbing wire 82 includes an insertion portion 84 corresponding to the insertion portion 74, a bar shaped portion 86 corresponding to the bar shaped portion 76, and a head portion 88 corresponding to the head portion 78. Similarly to the first load absorbing wire 72, the insertion portion 84 of the second load absorbing wire 82 can be inserted into a corresponding second insertion hole 65. However, the length of the insertion portion 84 is shorter than the length of the insertion portion 74 of the first load absorbing wire 72. More precisely, the length of the insertion portion 84 is shorter than the distance along the circumferential direction of the spool 18 from the opening of the first insertion hole 64 at the housing hole 62 side to the opening of the second insertion hole 65 at the housing hole 62 side.

A retaining portion 92 for retaining the head portion 78 of the first load absorbing wire 72 is formed at an end portion of the ratchet portion 40 configuring the above lock base 34 on the opposite side to that of the spool 18. The retaining portion 92 retains the head portion 78 so as to allow swinging about an axial direction parallel to the central axis of the spool 18, and the first load absorbing wire 72 is thereby coupled to the ratchet portion 40 (the lock base 34). The position where the retaining portion 92 is formed is further to the spool 18 radial direction outside than the second insertion hole 65, such that the retaining portion 92 and the second insertion hole 65 are not superimposed on each other along the axial direction of the spool 18 when the retaining portion 92 and the second insertion hole 65 are aligned with each other along a radial direction of the spool 18.

A retaining portion 94 is formed in the lock base 34, for retaining the head portion 88 of the second load absorbing wire 82, at a position shifted about the center axis of the lock base 34 by about 180 degrees from the forming position of the retaining portion 92. The retaining portion 94 retains the head portion 88 so as to be capable of swinging about an axial direction parallel to the central axis direction of the spool 18, and the second load absorbing wire 82 is thereby coupled to the ratchet portion 40 (the lock base 34). The position where the retaining portion 94 is formed is further to the spool 18 radial direction outside than the first insertion hole 64, such that the retaining portion 94 and the first insertion hole 64 are not superimposed on each other along the axial direction of the spool 18 when the retaining portion 94 and the first insertion hole 64 are aligned with each other along a radial direction of the spool 18.

Operation and Effect of the First Exemplary Embodiment

Explanation now follows regarding the operation and effect of the first exemplary embodiment.

The lock mechanism 30 is actuated when the vehicle to which the webbing take-up device 10 is mounted is in a sudden deceleration state with the webbing 20 pulled out from the spool 18 across the body of an occupant of the vehicle, and this state is detected by an acceleration sensor of the lock mechanism 30. The lock mechanism 30 is also actuated when the spool 18 is suddenly rotated in the pullout direction by the body of the occupant suddenly pulling the webbing 20 due to inertia acting during a vehicle deceleration state. When the lock mechanism 30 is actuated, the lock pawl 42 swings towards the ratchet portion 40 of the lock base 34, and the lock teeth 46 of the lock pawl 42 accordingly mesh with the ratchet teeth 44 of the ratchet portion 40.

Rotation of the lock base 34 in the pullout direction is thereby restricted, and hence rotation of the spool 18 in the pullout direction is also restricted. Due to pulling out of the webbing 20 taken up on the spool 18 being restricted by restricting rotation of the spool 18 in the pullout direction, the body of the occupant is firmly restrained by the webbing 20 as it attempts to move towards the vehicle front due to inertia during rapid vehicle deceleration.

Rotation force in the pullout direction is applied to the spool 18 in this state, due to the body of the occupant, attempting to move towards the vehicle front due to inertia, pulling the webbing 20. When this rotation force exceeds the mechanical strength of the torsion shaft 54, the insertion portion 74 of the first load absorbing wire 72, and the insertion portion 84 of the second load absorbing wire 82, plastic deformation starts such that the leg plate 14 side of the torsion shaft 54 twists in the pullout direction with respect to the leg plate 16 side of the torsion shaft 54. Accordingly, the spool 18 also starts to move in the pullout direction with respect to the lock base 34 whose rotation in the pullout direction is restricted by the lock pawl 42.

Figure 4:
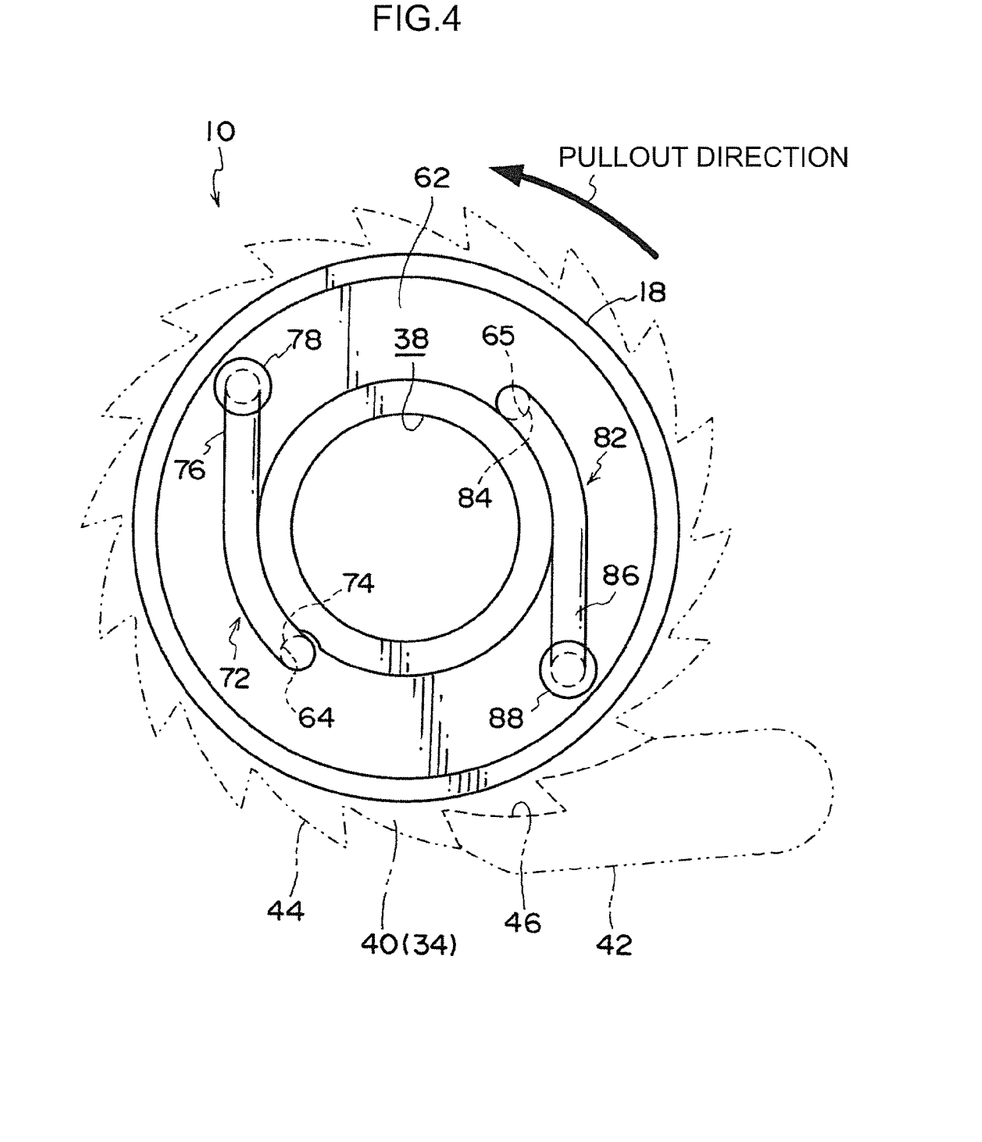
FIG. 4 is a side view corresponding FIG. 3, illustrating a state after rotation of the spool relative to the lock base in the pullout direction has started.

When rotation of the spool 18 with respect to the lock base 34 starts in the pullout direction, as shown in FIG. 4, the insertion portion 74 of the first load absorbing wire 72, of which the head portion 78 is retained in the retaining portion 92 of the lock base 34, is pulled out from the first insertion hole 64, and the insertion portion 84 of the second load absorbing wire 82, of which the head portion 88 is retained in the retaining portion 94, is pulled out from the second insertion hole 65. The insertion portions 74, 84 pulled out from the first insertion hole 64 and the second insertion hole 65 thereby bend around the edge of the opening of the first insertion hole 64 and the second insertion hole 65, respectively, and are pressed by an inner wall at the radial direction inside of the housing hole 62, and bent around to conform to the inner wall of the housing hole 62.

When the spool 18 further rotates in the pullout direction with respect to the lock base 34 from this state up until the point when the insertion portion 84 of the second load absorbing wire 82 is completely pulled out from the second insertion hole 65, the opening end of the second insertion hole 65 on the housing hole 62 side reaches the vicinity of the retaining portion 92, and the opening end of the first insertion hole 64 on the housing hole 62 side reaches the vicinity of the retaining portion 94.

As stated above, the retaining portion 92 is formed in a position further to the spool 18 radial direction outside than the second insertion hole 65 such that the retaining portion 92 and the second insertion hole 65 are not aligned with each other along the spool 18 axial direction when the retaining portion 92 and the second insertion hole 65 are aligned with each other along a radial direction of the spool 18. Similarly, the retaining portion 94 is formed in a position further to the spool 18 radial direction outside than the first insertion hole 64 such that the retaining portion 94 and the first insertion hole 64 are not superimposed on each other along the spool 18 axial direction when the retaining portion 94 and the first insertion hole 64 are aligned with each other along a radial direction of the spool 18.

Accordingly, when the opening end of the second insertion hole 65 on the housing hole 62 side reaches the retaining portion 92 side along the spool 18 radial direction, and the opening end of the first insertion hole 64 on the housing hole 62 side reaches the retaining portion 94 side along the spool 18 radial direction, as shown in FIG. 5, the head portion 88 of the second load absorbing wire 82 is positioned further to the spool 18 radial direction outside than the first insertion hole 64, and the head portion 78 of the first load absorbing wire 72 is positioned further to the spool 18 radial direction outside than the second insertion hole 65.

Figure 6:
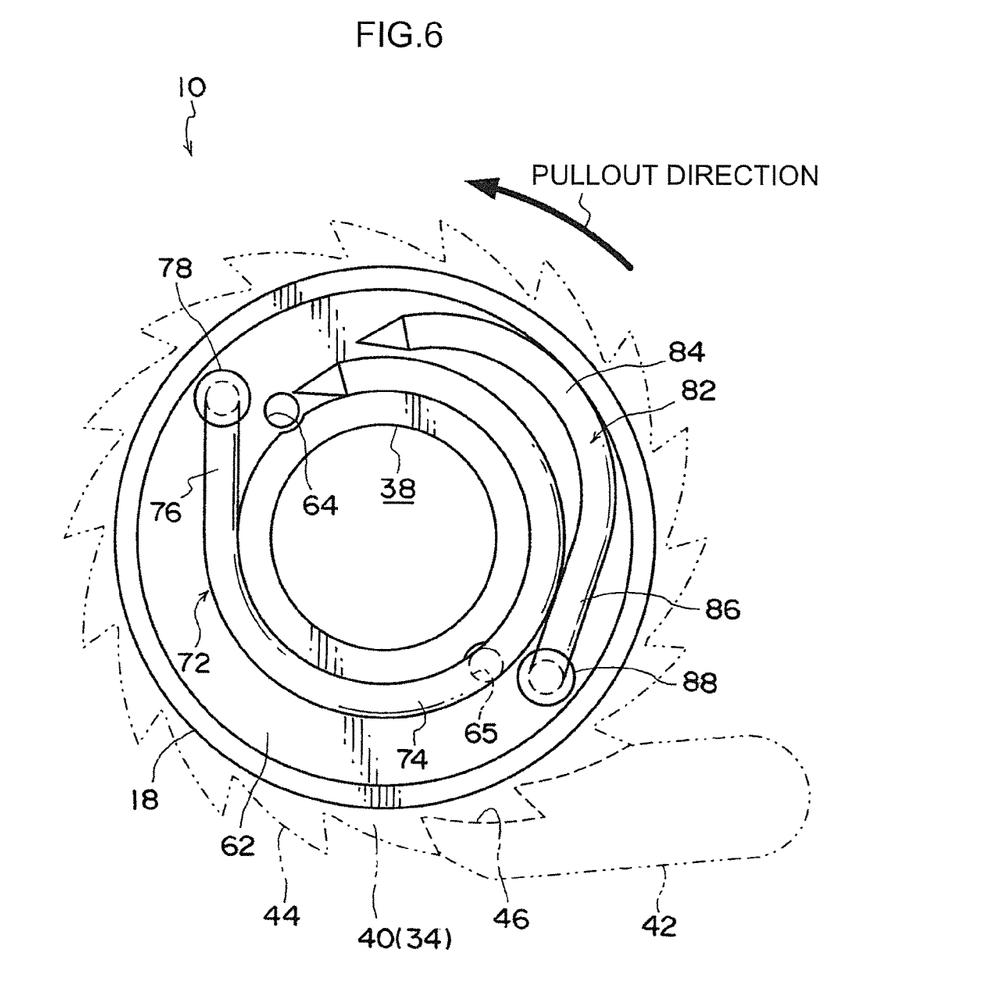
FIG. 6 is a side view corresponding FIG. 3, illustrating a state after further rotation of the spool relative to the lock base in the pullout direction has started from the state illustrated in FIG. 5.

In this state, as stated above, the whole of the insertion portion 84 of the second load absorbing wire 82 is pulled out from the second insertion hole 65. Hence, when the spool 18 is rotated further from this state in the pullout direction with respect to the lock base 34, as shown in FIG. 6, the first load absorbing wire 72, now interposed between the head portion 88 of the second load absorbing wire 82 and the inner wall of the housing hole 62 at the radial direction inside, presses the second load absorbing wire 82.

The second load absorbing wire 82 accordingly swings about the head portion 88 at the center, about an axial direction in the same direction as the central axis of the spool 18. The insertion portion 74 of the first load absorbing wire 72, pulled out from the first insertion hole 64, can thereby be inserted further between the head portion 88 of the second load absorbing wire 82 and the inner wall of the housing hole 62 at the radial direction inside.

In the webbing take-up device 10, due to the first load absorbing wire 72 being interposed between the head portion 88 of the second load absorbing wire 82 and the inner wall of the housing hole 62 at the radial direction inside, the insertion portion 74 of the first load absorbing wire 72 can be pulled out further than the second insertion hole 65 in the pullout direction. The sum of the length of the insertion portion 74 of the first load absorbing wire 72 and the length of the insertion portion 84 of the second load absorbing wire 82 can thereby be set longer than the circumferential length of an imaginary circle passing through the respective central axes of the first insertion hole 64 and the second insertion hole 65 and centered on the central axis of the spool 18. A longer stroke for energy absorption can thereby be set.

Second Exemplary Embodiment

Explanation now follows regarding a second exemplary embodiment of the present invention. Note that in the explanation of the second exemplary embodiment, portions that are basically the same as those of the first exemplary embodiment are allocated the same reference numerals and further detailed explanation thereof is omitted.

Figure 7:
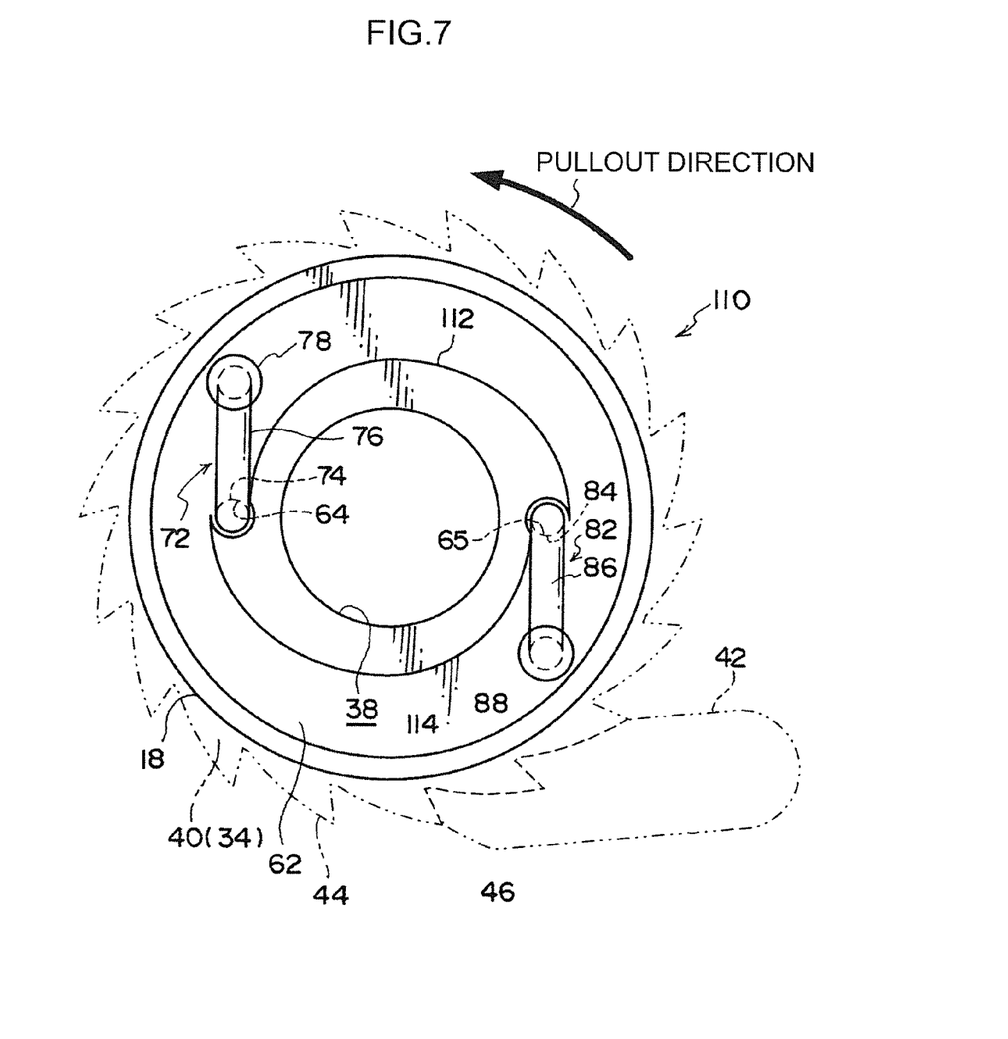
FIG. 7 is a side view corresponding FIG. 3, illustrating a schematic configuration of relevant portions of a webbing take-up device according to a second exemplary embodiment of the present invention.

FIG. 7 illustrates relevant portions of a webbing take-up device 110 according to the second exemplary embodiment, and corresponds to FIG. 3 referred to in the explanation of the first exemplary embodiment. As shown in FIG. 7, the webbing take-up device 110 has an inner wall on the spool 18 radial direction inside of a housing hole 62 configured to include a first guide portion 112 and a second guide portion 114.

The end of the inner wall of the first guide portion 112 at the pullout direction side is positioned in the vicinity of a portion at the spool 18 radial direction inside of the first insertion hole 64, and the first guide portion 112 gradually gets further away from the central axis of the spool 18 on progression towards the take-up direction side. The end portion of the inner wall of the first guide portion 112 on the take-up direction side is positioned in the vicinity of a portion at the spool 18 radial direction outside of the second insertion hole 65.

The end of the inner wall of the second guide portion 114 at the pullout direction side is positioned in the vicinity of a portion at the spool 18 radial direction inside of the second insertion hole 65, and the second guide portion 114 gradually gets further away from the central axis of the spool 18 on progression towards the take-up direction side. The end portion of the inner wall of the second guide portion 114 on the take-up direction side is positioned in the vicinity of a portion at the spool 18 radial direction outside of the first insertion hole 64.

In the webbing take-up device 110, the length of the insertion portion 84 of the second load absorbing wire 82 is about the same as the length of the insertion portion 74 of the first load absorbing wire 72.

Operation and Effect of the Second Exemplary Embodiment

Explanation now follows regarding operation and effect of the second exemplary embodiment.

Figure 8:
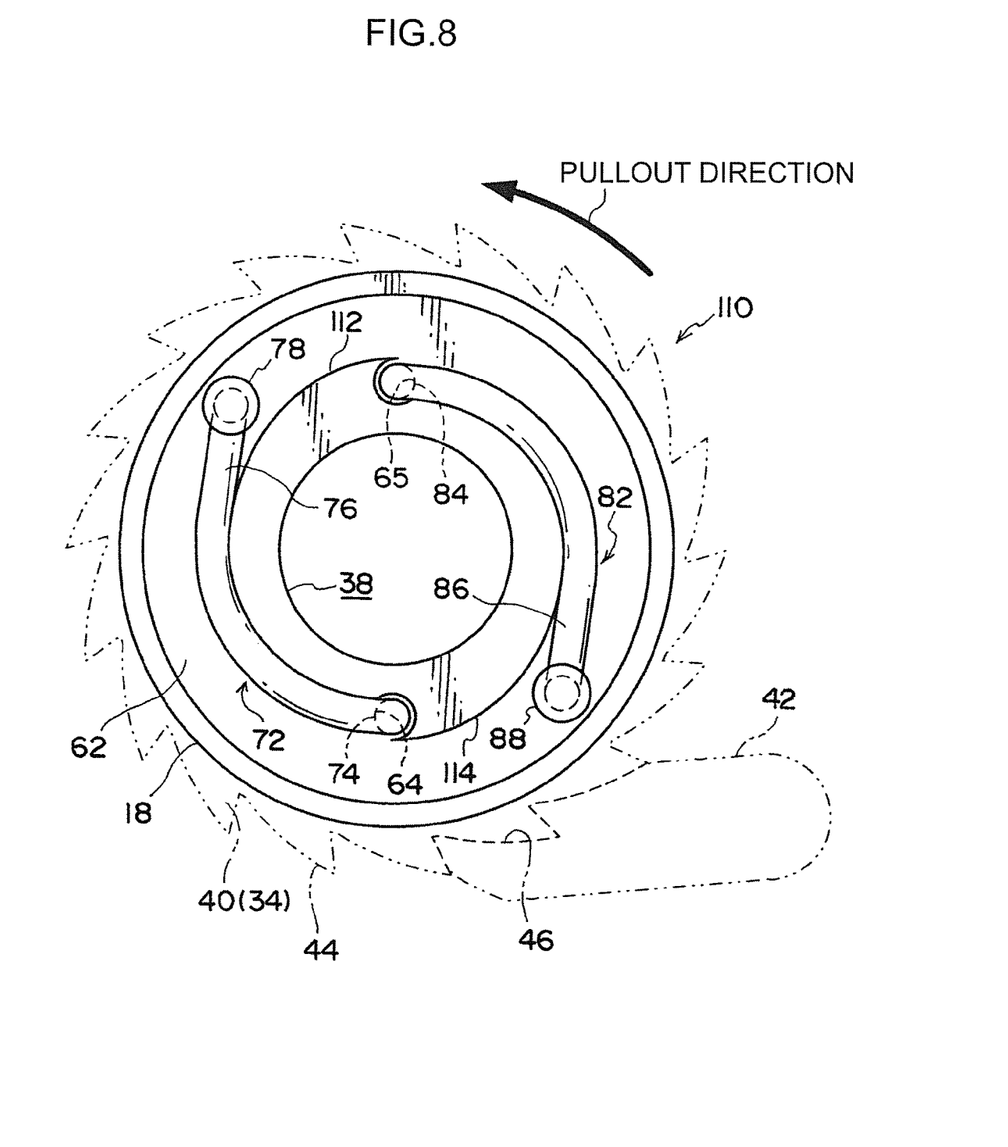
FIG. 8 is a side view corresponding to FIG. 7 illustrating a state in which the first energy absorbing member is deformed to conform to the first guide portion and the second energy absorbing member is deformed to conform to the second guide portion.

In the webbing take-up device 110, when rotation of the spool 18 with respect to the lock base 34 starts in the pullout direction, the insertion portion 74 of the first load absorbing wire 72 is pulled out thereby from the first insertion hole 64 and, as shown in FIG. 8, the insertion portion 74 of the first load absorbing wire 72 pulled out from the first insertion hole 64 is thereby pressed by the inner wall face of the first guide portion 112, and bends around to conform to the inner wall face of the first guide portion 112. Furthermore, when rotation of the spool 18 with respect to the lock base 34 starts in the pullout direction, the insertion portion 84 of the second load absorbing wire 82 is pulled out from the second insertion hole 65 and, as shown in FIG. 8, the insertion portion 84 of the second load absorbing wire 82 pulled out from the second insertion hole 64 is thereby pressed by the inner wall face of the second guide portion 114, and bent around to conform to the inner wall face of the second guide portion 114.

Figure 9:
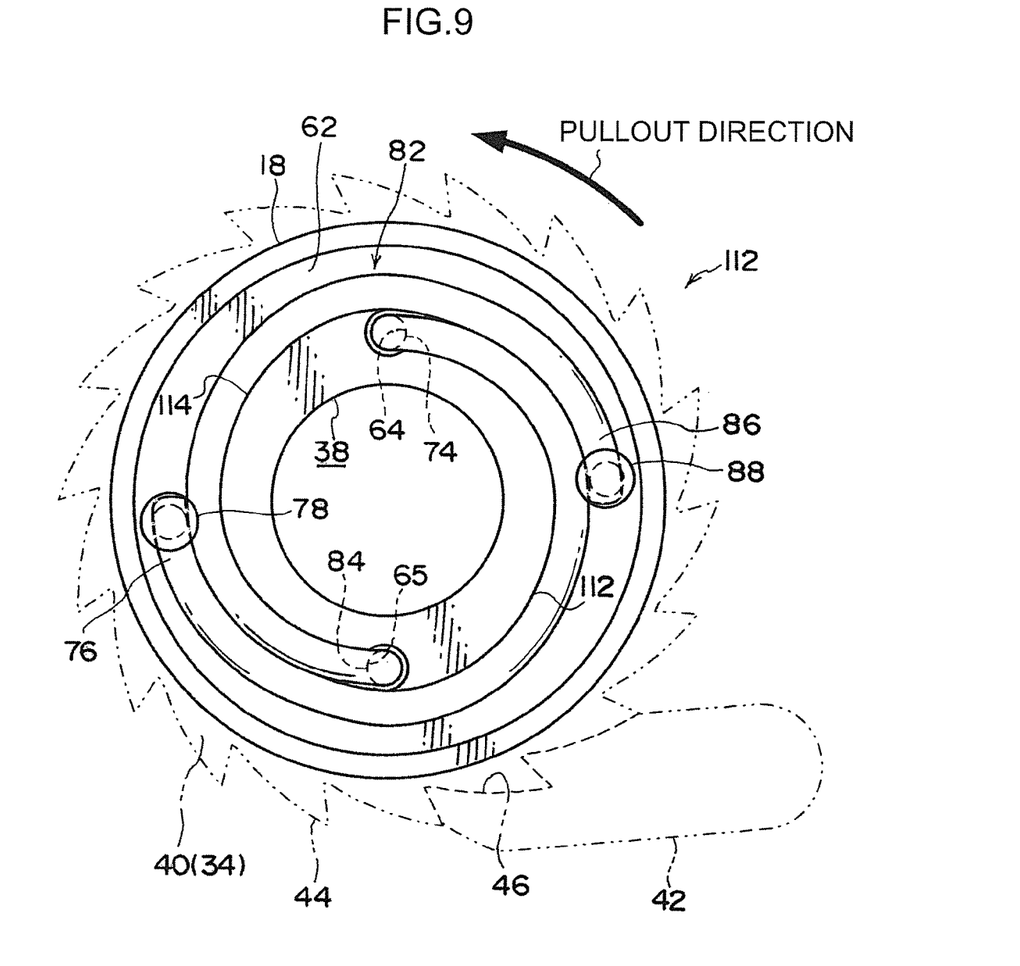
FIG. 9 is a side view corresponding to FIG. 7 illustrating a state in which the spool has started rotation in the pullout direction relative to the lock base up to a point where the first energy absorbing member is positioned at the outside of the second energy absorbing member and the second energy absorbing member is positioned at the outside of the first energy absorbing member.

The inner wall face of the first guide portion 112 gets further form the central axis of the spool 18 on progression towards the take-up direction side, and the end portion of the inner wall face of the first guide portion 112 on the take-up direction side is positioned in the vicinity of a portion at the spool 18 radial direction outside of the second insertion hole 65. Accordingly, when the head portion 78 of the first load absorbing wire 72 and the second insertion hole 65 become aligned with each other along a radial direction of the spool 18, the head portion 78 of the first load absorbing wire 72 is aligned at the outside of a portion of the insertion portion 84 of the second load absorbing wire 82 that has just been pulled out from the second insertion hole 65. When the spool 18 is further rotated from this state in the pullout direction with respect to the lock base 34, as shown in FIG. 9, the first load absorbing wire 72 is accommodated inside the housing hole 62 further to the spool 18 radial direction outside than the second load absorbing wire 82 further along in the take-up direction than the end portion on the take-up direction side of the first guide portion 112.

Moreover, the inner wall face of the second guide portion 114 gets further away from the central axis of the spool 18 on progression towards the take-up direction side, and the end portion of the inner wall face of the second guide portion 114 on the take-up direction side is positioned in the vicinity of a portion at the spool 18 radial direction outside of the first insertion hole 64. Accordingly, when the head portion 88 of the second load absorbing wire 82 and the first insertion hole 64 are aligned with each other along the spool 18 radial direction, the head portion 88 of the second load absorbing wire 82 is aligned at the outside of a portion of the insertion portion 74 of the first load absorbing wire 72 that has just been pulled out from the first insertion hole 64. When the spool 18 is further rotated from this state in the pullout direction with respect to the lock base 34, as shown in FIG. 9, the second load absorbing wire 82 is accommodated inside the housing hole 62 further to the spool 18 radial direction outside than the first load absorbing wire 72 further along in the take-up direction than the end portion on the take-up direction side of the second guide portion 114.

Accordingly, in the webbing take-up device 110, even after the head portion 78 of the first load absorbing wire 72 is aligned at the outside of the portion of the insertion portion 84 of the second load absorbing wire 82 that has just been pulled out from the second insertion hole 65, and after the head portion 88 of the second load absorbing wire 82 is aligned at the outside of the portion of the insertion portion 74 of the first load absorbing wire 72 that has just been pulled out from the first insertion hole 64, the insertion portion 74 of the first load absorbing wire 72 and the insertion portion 84 of the second load absorbing wire 82 can still be pulled out from the first insertion hole 64 and the second insertion hole 65, respectively, and deformed. The sum of the length of the insertion portion 74 of the first load absorbing wire 72 and the length of the insertion portion 84 of the second load absorbing wire 82 can thereby be set longer than the circumferential length of an imaginary circle passing through the respective central axes of the first insertion hole 64 and the second insertion hole 65 and centered on the central axis of the spool 18. A longer stroke for energy absorption can thereby be set.

What is claimed is:

1. A webbing take-up device comprising:
   a spool that takes up and stores a long band-shaped webbing from a length direction base end side of the webbing by rotating in a take-up direction, and that is rotated in a pullout direction opposite to the take-up direction by the webbing being pulled towards a leading end side;
   a first energy absorbing member inserted into a first insertion hole formed in the spool at a position separated in a radial direction from a central axis of the spool and opening at a first axial direction end of the spool;
   a second energy absorbing member inserted into a second insertion hole formed at a different position in the spool from the forming position of the first insertion hole, at a position separated in a radial direction from the central axis of the spool and opening at the first axial direction end of the spool;
   a coupling member coupled to a portion at a second axial direction end of the spool or at an intermediate axial direction portion of the spool, such that the coupling member is not able to perform relative rotation with respect to the spool;
   a lock unit comprising a lock base and restricting rotation of the lock base when actuated, wherein the lock base:
   is provided at the first axial direction end side of the spool so as to be rotatable relative to the spool,
   is coupled through the coupling member to the spool so as to be non-rotatable relative to the spool,
   retains base end portions of the first energy absorbing member and the second energy absorbing member,
   by relative rotation with respect to the spool in the take-up direction, engages the first energy absorbing member with the spool and deforms the first energy absorbing member along the spool circumferential direction while pulling the first energy absorbing member out from the first insertion hole such that the first energy absorbing member is coiled on a front face of the lock base, and
   by relative rotation with respect to the spool in the take-up direction, engages the second energy absorbing member with the spool and deforms the second energy absorbing member along the spool circumferential direction while pulling the second energy absorbing member out from the second insertion hole such that the second energy absorbing member is coiled on a front face of the lock base;

wherein the base end portion of the second energy absorbing member is retained at the first axial direction end of the spool by a second retaining portion of the lock base at a position separated further toward to the rotation radial direction outside from the central axis of the spool than a distance from the central axis of the spool to the first insertion hole opening position at the first axial direction end of the spool, and the base end portion of the first energy absorbing member is retained at the first axial direction end of the spool by a first retaining portion of the lock base at a position separated further toward the rotation radial direction outside from the central axis of the spool than a distance from the central axis of the spool to the second insertion hole opening position at the first axial direction end of the spool, and wherein when the first and second retaining portions and first and second insertion holes are not superimposed with each other along an axial direction when the first and second retaining portions and first and second insertion holes are aligned with each other along a radial direction of the spool.

2. The webbing take-up device of claim 1, wherein the base end portion of the first energy absorbing member is retained by the lock base so as to be capable of swinging about an axis parallel to the central axis of the spool, and a length of a portion of the first energy absorbing member inserted into the first insertion hole is set the same as or less than a length along the pullout direction from the first insertion hole opening position to the second insertion hole opening position at the first axial direction end of the spool.

3. The webbing take-up device of claim 1, further comprising:

a first guide portion provided at the take-up direction side of the second insertion hole opening position at the first axial direction end of the spool so as to be capable of interacting with the first energy absorbing member, the first guide portion guiding the first energy absorbing member further to the spool radial direction outside than the second insertion hole by interacting with the first energy absorbing member; and a second guide portion provided at the take-up direction side of the first insertion hole opening position at the first axial direction end of the spool so as to be capable of interacting with the second energy absorbing member, the second guide portion guiding the second energy absorbing member further to the spool radial direction outside than the first insertion hole by interacting with the second energy absorbing member.

4. The webbing take-up device of claim 1, wherein all portions of both the first and second energy absorbing members that are coiled as a result of said relative rotation are in contact with said front face of said lock base.

5. The webbing take-up device of claim 1, wherein the first and second energy absorbing members that are coiled on the front face of the lock base are interleaved with one another along a plane orthogonal to the axis of rotation of the spool.

* * * * *